(12) United States Patent
Otanez Trewartha et al.

(10) Patent No.: US 12,031,662 B2
(45) Date of Patent: Jul. 9, 2024

(54) INSULATED PORTABLE SPA AND PROCESSES FOR INSULATING

(71) Applicant: Sundance Spas, Inc., Chino Hills, CA (US)

(72) Inventors: Oscar H. Otanez Trewartha, Tijuana (MX); Adrian Alfaro, Menifee, CA (US); Erica Aloisia Moir, Santa Ana, CA (US)

(73) Assignee: Sundance Spas, Inc., Chino, CA (US)

( * ) Notice: Subject to any disclaimer, the term of this patent is extended or adjusted under 35 U.S.C. 154(b) by 192 days.

(21) Appl. No.: 17/657,107

(22) Filed: Mar. 29, 2022

(65) Prior Publication Data
US 2022/0316645 A1 Oct. 6, 2022

Related U.S. Application Data

(60) Provisional application No. 63/168,166, filed on Mar. 30, 2021.

(51) Int. Cl.
| | | |
|---|---|---|
| *F16L 59/04* | (2006.01) | |
| *A61H 33/00* | (2006.01) | |
| *F16L 59/02* | (2006.01) | |

(52) U.S. Cl.
CPC .......... *F16L 59/04* (2013.01); *A61H 33/6005* (2013.01); *F16L 59/02* (2013.01)

(58) Field of Classification Search
CPC ...... F16L 59/04; F16L 59/02; A61H 33/6005; E04H 2004/0068; E04H 4/0037

USPC ............................................. 4/545, 538, 548
See application file for complete search history.

(56) References Cited

U.S. PATENT DOCUMENTS

| | | | |
|---|---|---|---|
| 6,243,889 B1 * | 6/2001 | Ducharme | .............. A47K 3/161 |
| | | | 4/584 |
| 9,295,611 B2 | 3/2016 | Lamberson | |
| 9,938,740 B1 * | 4/2018 | Nygard | .............. A61H 33/6005 |
| 11,561,026 B1 * | 1/2023 | Tandler | .................... H02S 40/44 |

FOREIGN PATENT DOCUMENTS

| | | | | |
|---|---|---|---|---|
| WO | WO 2013/016074 A2 | 1/2013 | | |
| WO | WO-2013016074 A2 * | 1/2013 | ......... | A61H 33/6005 |

OTHER PUBLICATIONS

International Search Report and Written Opinion dated Sep. 8, 2022 for Application No. PCT/US2022/022392, 38 pages.

\* cited by examiner

*Primary Examiner* — Lori L Baker
(74) *Attorney, Agent, or Firm* — Knobbe, Martens, Olson & Bear, LLP (57) ABSTRACT

Insulated portable spas and processes for insulating spas are described herein. The processes can include filling the undercabinet cavity of the spa with insulative fiberglass while the spa is in an upright position. The insulative fiberglass can be blown-in through sidewalls of the box frame. The portable spas can include an insulative air barrier at the bottom of the spa.

24 Claims, 12 Drawing Sheets

INSULATED PORTABLE SPA AND PROCESSES FOR INSULATING

INCORPORATION BY REFERENCE TO ANY PRIORITY APPLICATIONS

This application claims priority benefit of U.S. Provisional Application No. 63/168,166, filed Mar. 30, 2021, which is hereby incorporated by reference in its entirety herein.

Any and all applications for which a foreign or domestic priority claim is identified in the Application Data Sheet as filed with the present application are hereby incorporated by reference under 37 C.F.R. § 1.57.

BACKGROUND

Field of Invention

The product outlined below is a portable spa that is insulated using a combination of specific products and manufacturing techniques to enhance thermal performance and energy efficiency.

Description of the Related Art

Portable spas can require a lot of power to maintain a constant high temperature when heat escapes through the spa walls. In particular, uninsulated spas lose heat rapidly and need to be re-heated for each use. Insulation can slow heat dissipation to keep water hot. Some spas include a foam or reflective material on the outer walls of the spa. Other spas fill the interior of the spa frame with foam.

SUMMARY

Prior methods of filling the undercabinet cavity of the spa with insulation require the portable spa to be in an inverted position because the insulation is provided through a bottom surface of the spa. After the undercabinet cavity has been filled with the insulation, the spa has to be flipped over to an upright position for water testing. If any issues arise during the water test and/or further insulation is needed, the spa must be flipped back to the inverted position to access the bottom surface of the spa. This process must be repeated until the spa has completed all manufacturing tests. The process of flipping the spa is labor intensive and lengthens the manufacturing process. Thus, further improvements are needed to simply the manufacturing process and reduce the number of times the spa must be flipped.

The present disclosure is related to an insulation process that reduces the number of times the spa must be flipped, thus simplifying the manufacturing process. The processes described herein blow insulation into the undercabinet cavity of the spa while the spa is in the upright position. Even if additional insulation is needed, the insulation can be blown into the undercabinet cavity without flipping the spa to the inverted position. In this process, the insulation is blown into the undercabinet cavity through one or more sidewalls of the box frame. As used herein, the sidewalls may be inclusive of at least a part of a corner of the box frame.

The insulation processes described herein use loose-fill fiberglass (also referred to as glass wool) that can be processed through a pneumatic device and blown into a desired space. Fiberglass fill can be more desirable than traditional spray foam because the fiberglass fill can provide improved energy efficiency. In the techniques described herein, the insulative fiberglass is not packed, pushed, or otherwise tamped down to achieve an optimal density. After installation, the insulative fiberglass can have a density in the range of 1.6 pounds per cubic foot to 2.6 pounds per cubic foot, for example in the range of about 2.2 to about 2.3 pounds per cubic foot. The insulative fiberglass can exhibit particular properties to facilitate repair. For example, the fiberglass can be hydrophobic so that water runs through the insulative fiberglass. The fiberglass may change color in response to any leaks. Although the methods described herein generally refer to fiberglass, the same methods can be applied to other types of insulation like spray foam.

The spas described herein provide improved insulation by creating an air gap at the bottom of the spa. A base insulation barrier can be applied to the box frame at a location spaced apart from the bottom edge of the spa. This creates an insulating air barrier at the bottom of the spa. Unlike prior insulation techniques that fill the spa with insulation from the bottom of the spa, the insulating air barrier described herein has no openings or accessible openings for filling the undercabinet cavity of the spa.

Certain methods of insulating a spa include installing a flexible bulkhead in a box frame to separate equipment from the box frame. The box frame can have a top side and a bottom side separated by sidewalls. Prior to installing the flexible bulkhead, pipes and/or equipment may be passed through self-sealing holes in the flexible bulkhead.

A base insulation barrier may be mounted on the bottom side of the box frame. The base insulation barrier can be mounted at a position spaced apart from the bottom edge of the box frame to form an air insulation layer between the base insulation barrier and the bottom edge of the box frame. When installed, the base insulation layer can be a continuous surface without any openings, accessible openings, and/or repaired openings.

A fabric barrier and/or insulative barrier can be mounted to the sidewalls of the box frame. The fabric barrier can include a breathable fabric for ventilation and visualization of the fiberglass fill. The fabric barrier may be mounted to all sidewalls of the box frame except in a front region to provide access to the equipment pack, which can include the electronics and controls. An insulative barrier can be mounted over the fabric barrier except in regions where access is desired for filling the cavity of the box frame. For example, one or more regions of the fabric barrier on a rear side of the box frame, opposite the equipment pack, may be exposed from the insulative barrier. As illustrated in the drawings, one or more regions of the fabric barrier on the rear corners of the box frame may be exposed from the insulative barrier.

The process can include creating openings in the fabric barrier and/or the insulative barrier for filling the undercabinet cavity with insulation and/or for ventilation. The openings can be created in the exposed regions of the fabric barrier, for example on the rear side or corners of the spa. Additional openings can be created on the left and right sidewalls of the insulative barrier to decrease the length of the hose needed to fill the undercabinet cavity. The openings can generally be positioned closer to the top side of the box frame than the bottom side of the box frame.

The insulative fiberglass can be blown into the cavity space between the flexible bulkhead and the box frame.

After the insulative fiberglass has been blown through the openings, the openings can be sealed, for example with tapes or patches. The insulative fiberglass can be hydrophobic to cause any leaked moisture to run through the insulative fiberglass, making vacuum or removal of the leaked moisture easier. In some embodiments, the insulative fiberglass may change color in response to moisture, which makes the leak easier to identify. Optionally, the exposed portions of the fabric barrier can be covered with additional insulative barriers.

The insulated portable spas described herein facilitate servicing of the spa at the owner's home. When servicing is required, an external side panel of the spa may be removed. After removing the external side panel, an insulative barrier and/or fabric barrier may be cut or peeled back to access the insulative fiberglass within the undercabinet cavity of the spa. The service technician can pull out the insulative fiberglass by hand to locate the leak. Any moisture caused by the leak can be removed, for example by vacuum. When the insulative fiberglass is hydrophobic, the leaked moisture runs through the fiberglass making the moisture easier to remove. Leaks may also be identified by a change in color in the insulative fiberglass. After the moisture has been removed and the leak has been repaired, the previously removed insulative fiberglass may be reinserted into the undercabinet cavity. If necessary, additional insulative fiberglass can be added to the spa. The insulative barrier and/or fabric barrier can reinstalled or repaired, for example using adhesive tape or patches.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Figure 1:
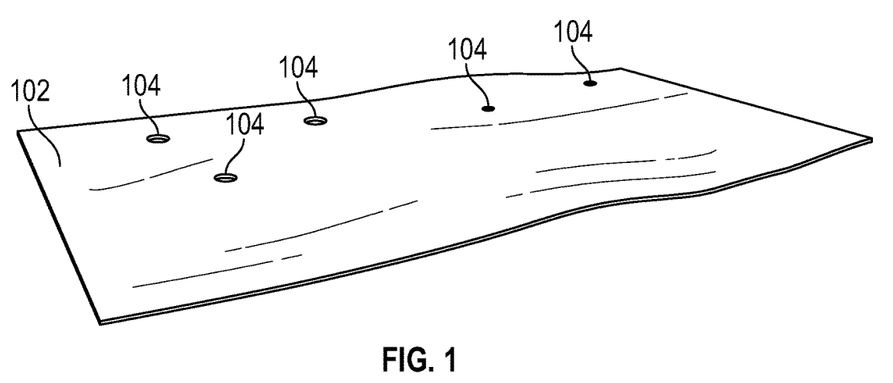
FIG. 1 illustrates the bulkhead being prepared with openings to allow spa piping to pass through the bulkhead.

FIG. 1 illustrates a bulkhead 102. The bulkhead 102 creates a physical separation to separate the insulating fiberglass from the equipment like pumps, heaters, and electronics. The bulkhead 102 can include one or more sheets or layers of material, for example an insulating material. The bulkhead 102 can be a flexible thermal barrier that is easy to install self-seals around plumbing to inhibit the insulating fiberglass from entering the equipment pack. The bulkhead 102 can include ethylene-vinyl acetate (EVA), reflective foil, bubble wrap, polyurethane, polypropylene, insulating fabric, and/or other insulating material. In other embodiments, the bulkhead 102 can form a rigid barrier.

Figure 2:
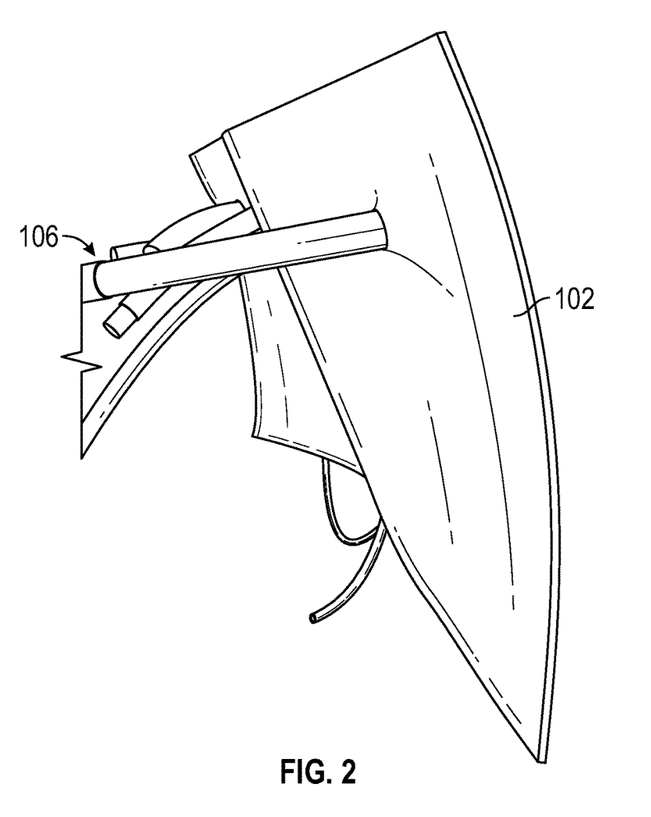
FIG. 2 illustrates installing the bulkhead with the pipes passing through the openings in the bulkhead.

The bulkhead 102 can include one or more openings 104 for piping 106 or other equipment to pass through the bulkhead 102. As shown in FIG. 2, the one or more openings 104 can be narrow cut openings that seal the bulkhead 102 against the piping 106 as they pull through. For example, each opening 104 can be an X-shaped slit where each leg of the "X" is undersized relative to the diameter of a pipe that the slit receives. Alternatively, the one or more openings 104 can be an undersized hole that stretches around a corresponding pipe. This keeps the fiberglass inside of the spa undercabinet cavity and away from the spa equipment.

Figure 3:
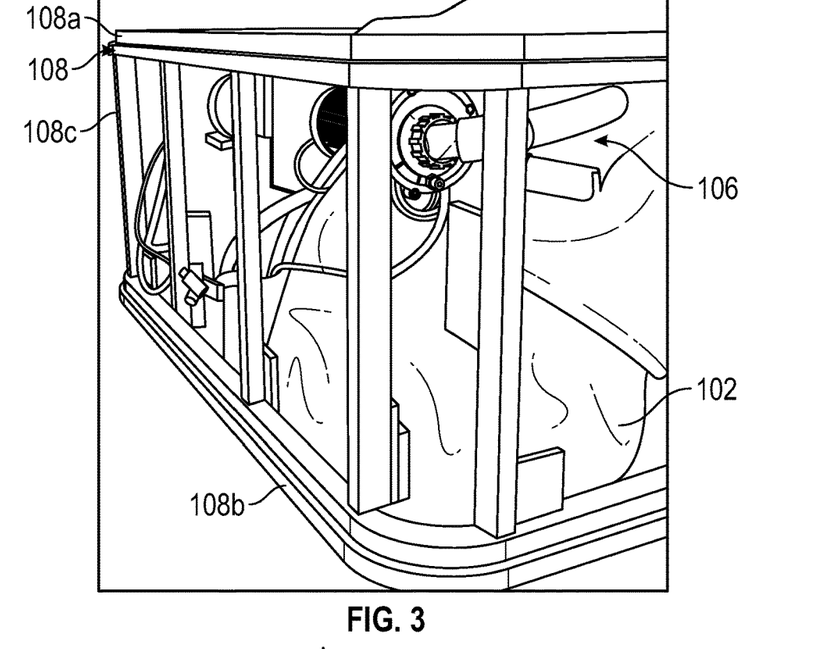
FIGS. 3 and 4 illustrate the bulkhead installed in a box frame of the spa.
Figure 4:
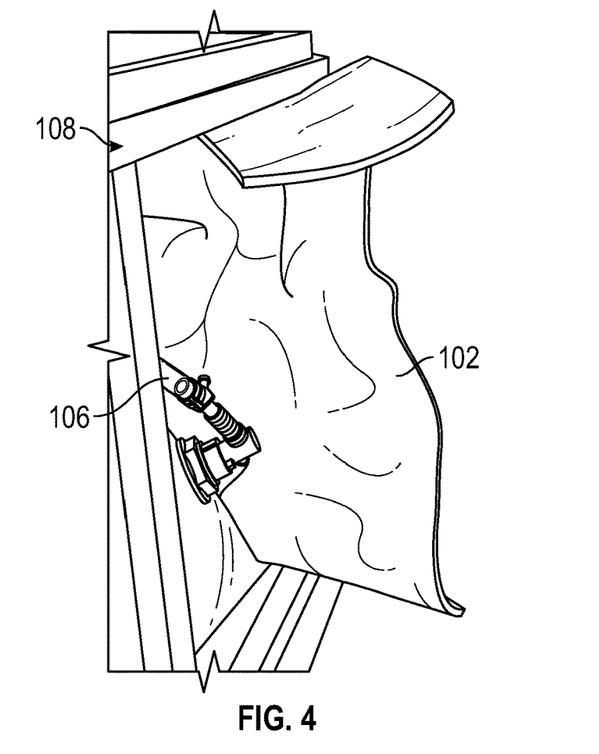

FIGS. 3 and 4 illustrate the bulkhead 102 and equipment, including piping 106, being installed in the box frame 108 of the spa. The box frame 108 includes a top side 108b and a bottom side 108a separated by sidewalls 108c. As used herein, sidewalls 108c may be inclusive of corners of the box frame 108. In an operational or upright position, the bottom side 108a of the box frame 108 will face or sit on the ground, while the top side 108b will be the open side where the user enters the spa. The box frame 108 can include multiple struts defining the top side 108b and the bottom side 108a and interconnecting the top side 108b and the bottom side 108a. The struts can be made of wood, metal, carbon fiber, hard plastic, and/or other materials to provide mechanical support.

As illustrated, the bulkhead 102 and equipment can be installed in the box frame 108 while the box frame 108 inverted and the top side 108b is sitting on the ground. The bulkhead 102 can be installed from the bottom side 108a or through openings in the sidewalls 108c of the box frame 108. Although not shown, the heater and electrical equipment may be disposed inward of the bulkhead 102, to separate the equipment from the sidewalls 108c of the box frame 108. The bulkhead 102 can be mounted to the box frame 108, for example using staples, nails, tape, adhesive, or other fastening means. Baffling may be provided in the box frame 108 to reduce the amount of bulkhead 102 needed for the spa.

Figure 5:
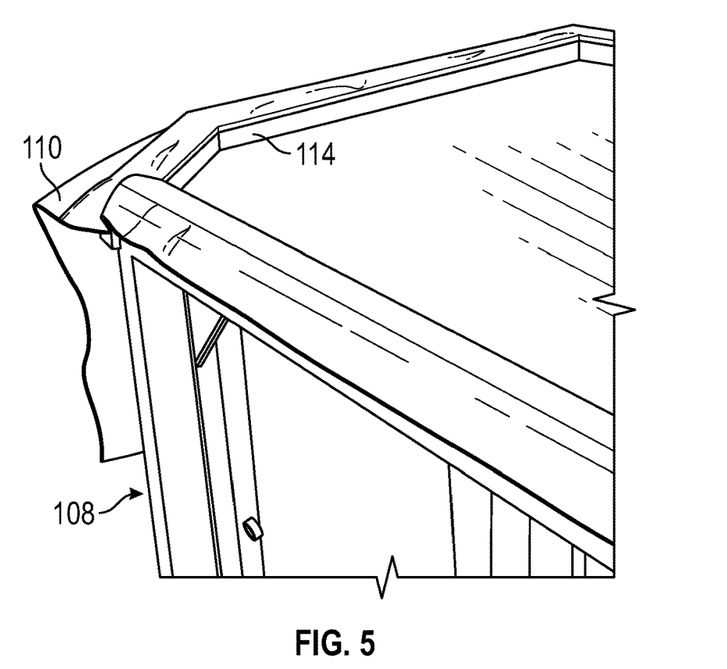
FIGS. 5 and 6 depict the use of plywood strips to attach an insulation barrier to bottom members of the box frame.
Figure 6:
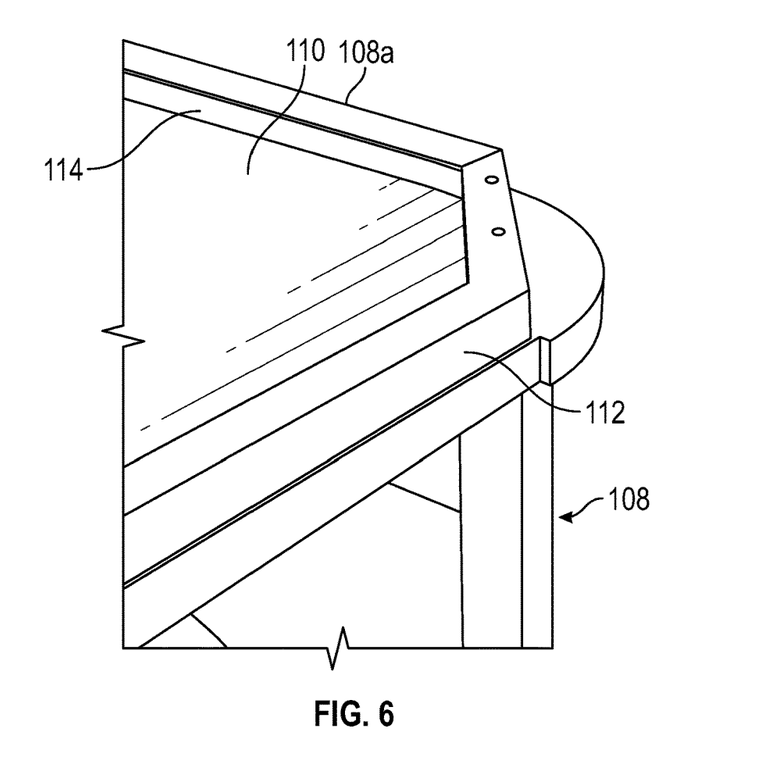

FIGS. 5 and 6 illustrate the addition of an insulative material on the bottom side 108a of the box frame 108 forming a base insulation barrier 110. The base insulation barrier 110 can be a sheet or sheets of reflective foil insulation, bubble wrap, and/or insulating fabric. The box frame 108 can include one or more struts extending across the bottom side 108a of the box frame 108 to support the base insulation barrier 110. The base insulation barrier 110 can be installed while the frame 108 is still in its inverted position. When the box frame 108 is inverted to the upright position, the base insulation barrier 110 can extend across the box frame 108 at a position elevated relative to bottom edges of the box frame 108 to create an air gap between the bottom of the box frame 108 and the base insulation barrier 110. The portion of the box frame 108 extending between the base insulation barrier 110 and the bottom edge of the box frame 108 can form a rail 112. The rail 112 can be made of wood, metal, carbon fiber, hard plastic, and/or other materials. The rail 112 can serve as a kickplate.

The base insulation barrier 110 suspends the fiberglass above the bottom edges of the box frame 108, thus creating an insulating air barrier. The base insulation barrier 110 can reflect the heat back to the inside of the spa. The base insulation barrier 110 can be formed by wide sheets of materials to reduce the number of fasteners. When installed the base insulation barrier 110 forms a continuous surface with no openings or accessible openings to fill the undercabinet cavity of the spa. In some embodiments, the base insulation barrier 110 forms a bottom surface of the spa, albeit spaced apart from the bottom edge of the spa. In other embodiments, a cover may be provided at the bottom edge of the spa to form the bottom surface of the spa. The cover may have no openings or accessible openings to fill the undercabinet cavity of the spa.

FIG. 5 illustrates the base insulation barrier 110 being secured to the box frame 108. The base insulation barrier 110 can be secured to the box frame 108 by staples, nails, tape, adhesive, or other fastening means. For example, the ends of the base insulation barrier 110 can be secured between strips 114 and the box frame 108 using fasteners. The strips 114 can be made of plywood, metal, carbon fiber, plastic, and/or other materials. FIG. 6 illustrates the base insulation barrier 110 after the excess material has been cut away. Optionally, a cover can be secured to the bottom side 108a of the box frame 108 to form a bottom surface of the spa. Once the base insulation barrier 110 has been secured to the box frame 108, the box frame 108 may be inverted so the bottom side 108a is facing the ground.

Figure 8:
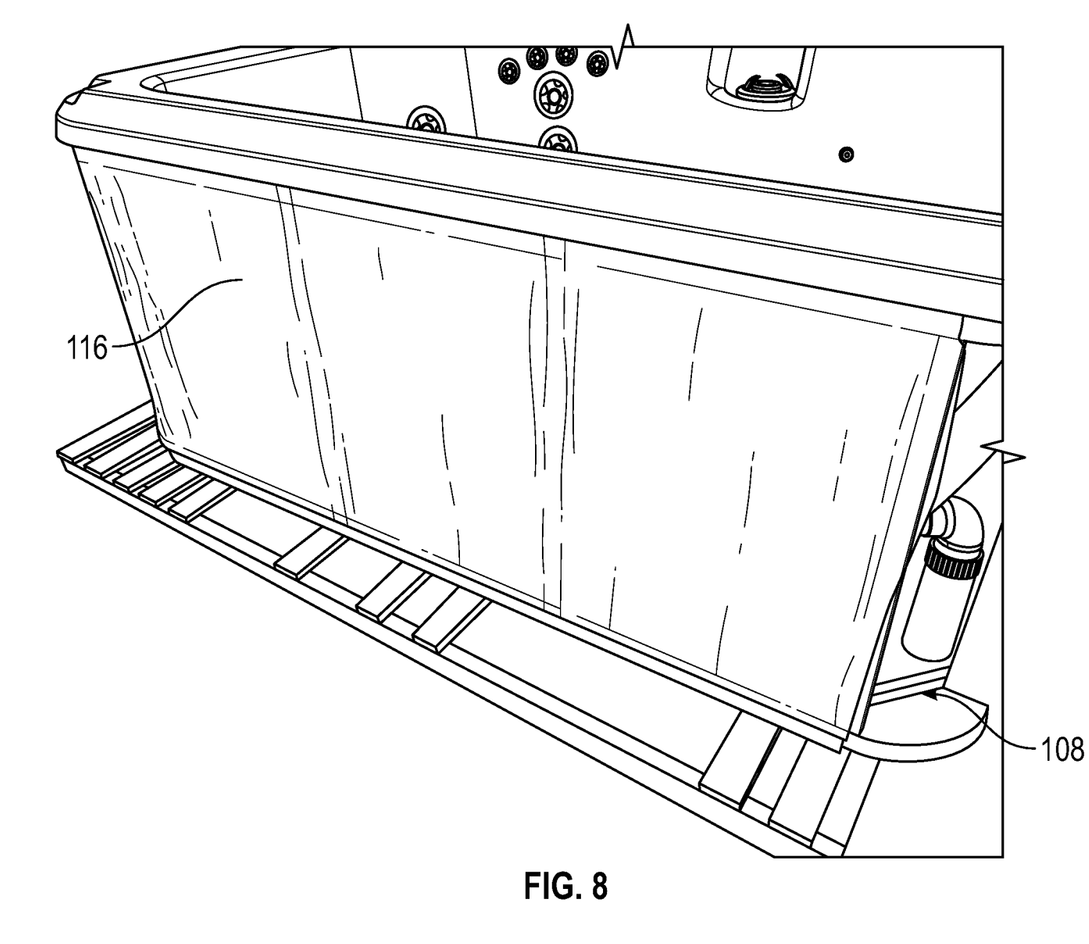
FIG. 8 shows a side of the box frame covered with a layer of breathable fabric.
Figure 9:
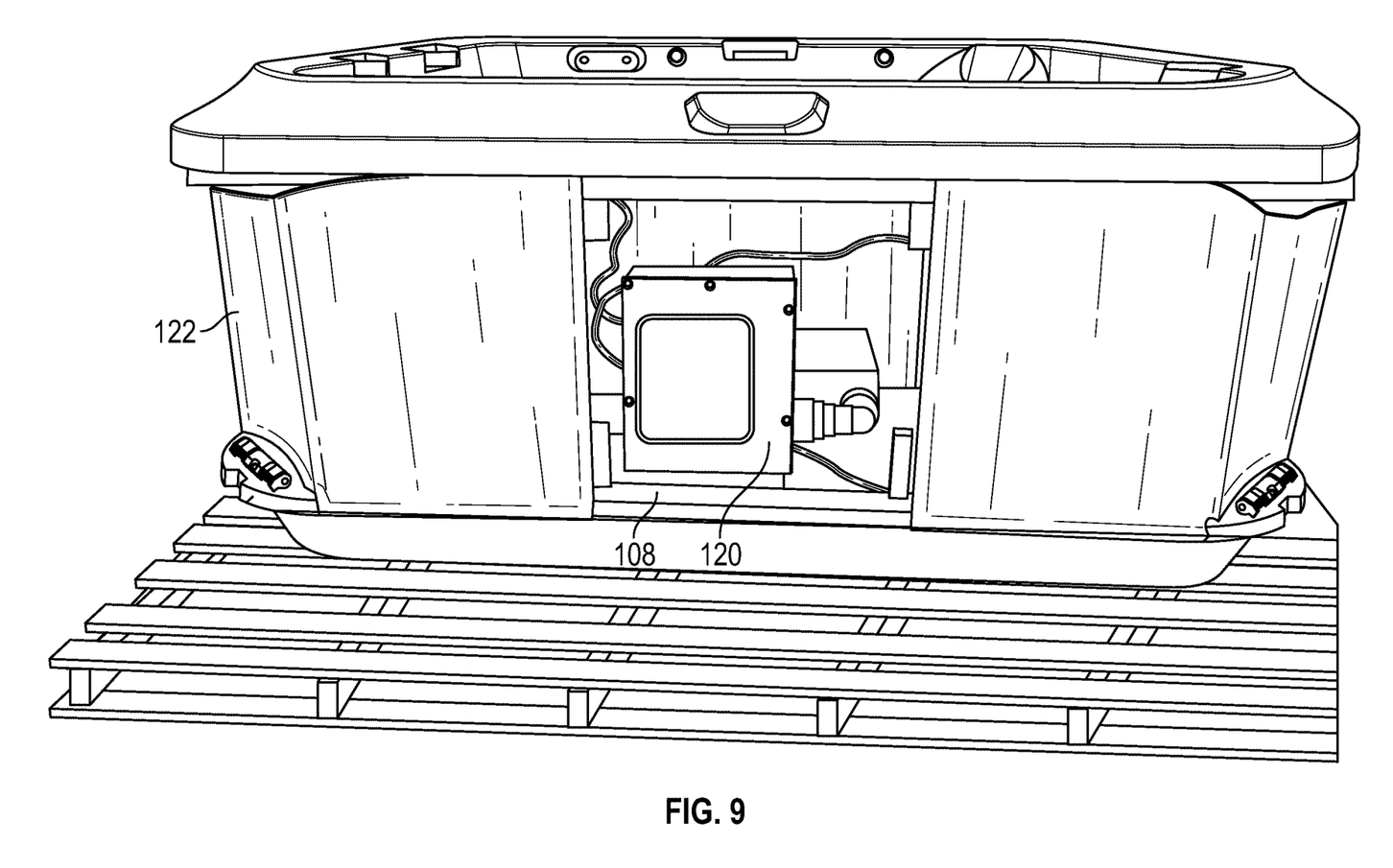
FIG. 9 shows a front side of the spa when wrapped with an insulative barrier.
Figure 10:
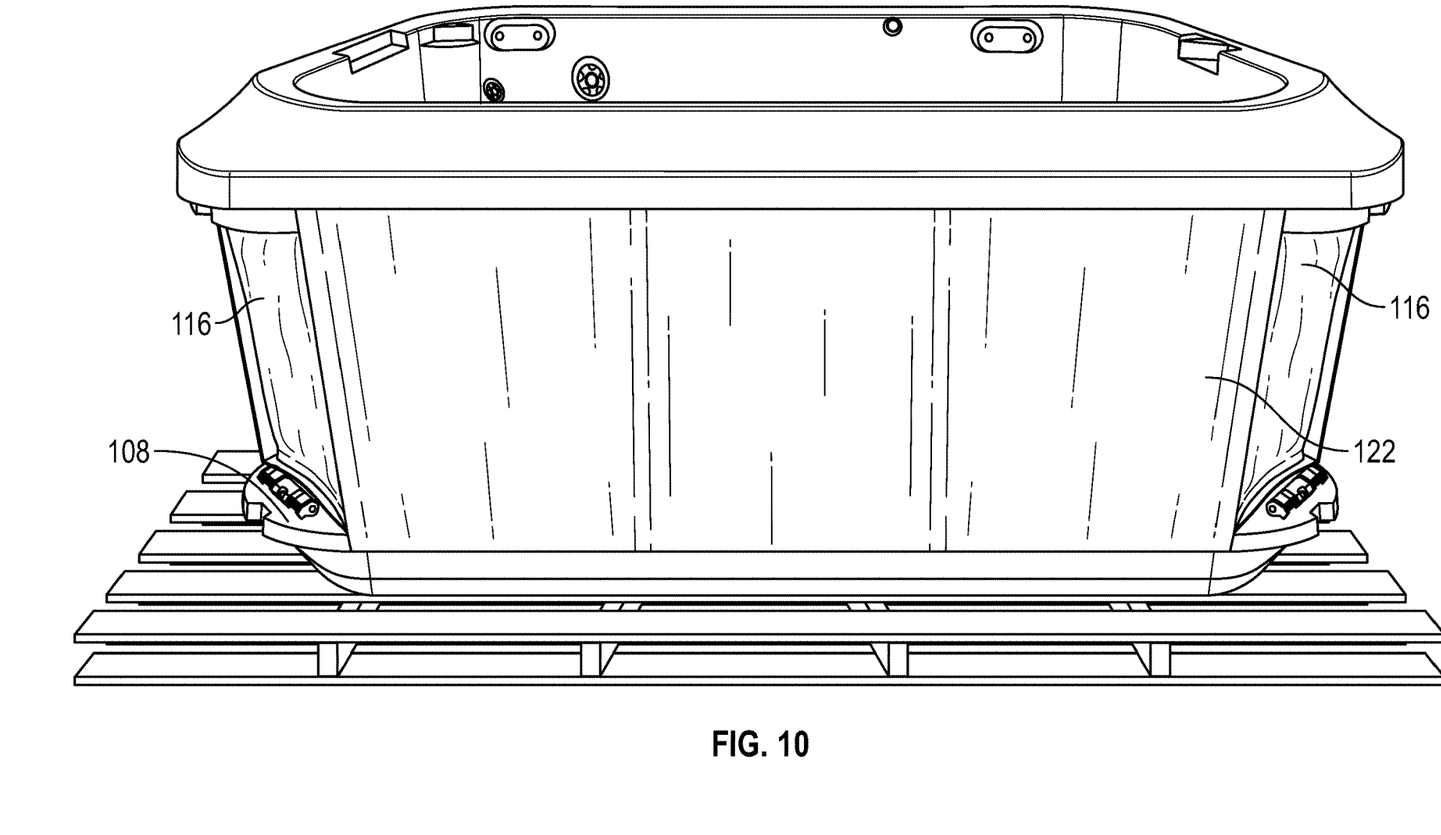
FIGS. 10 and 11 show a rear and side views, respectively, of the spa with the insulative barrier wrapped around the rear and sides, but with the corners exposed to the fabric barrier.
Figure 11:
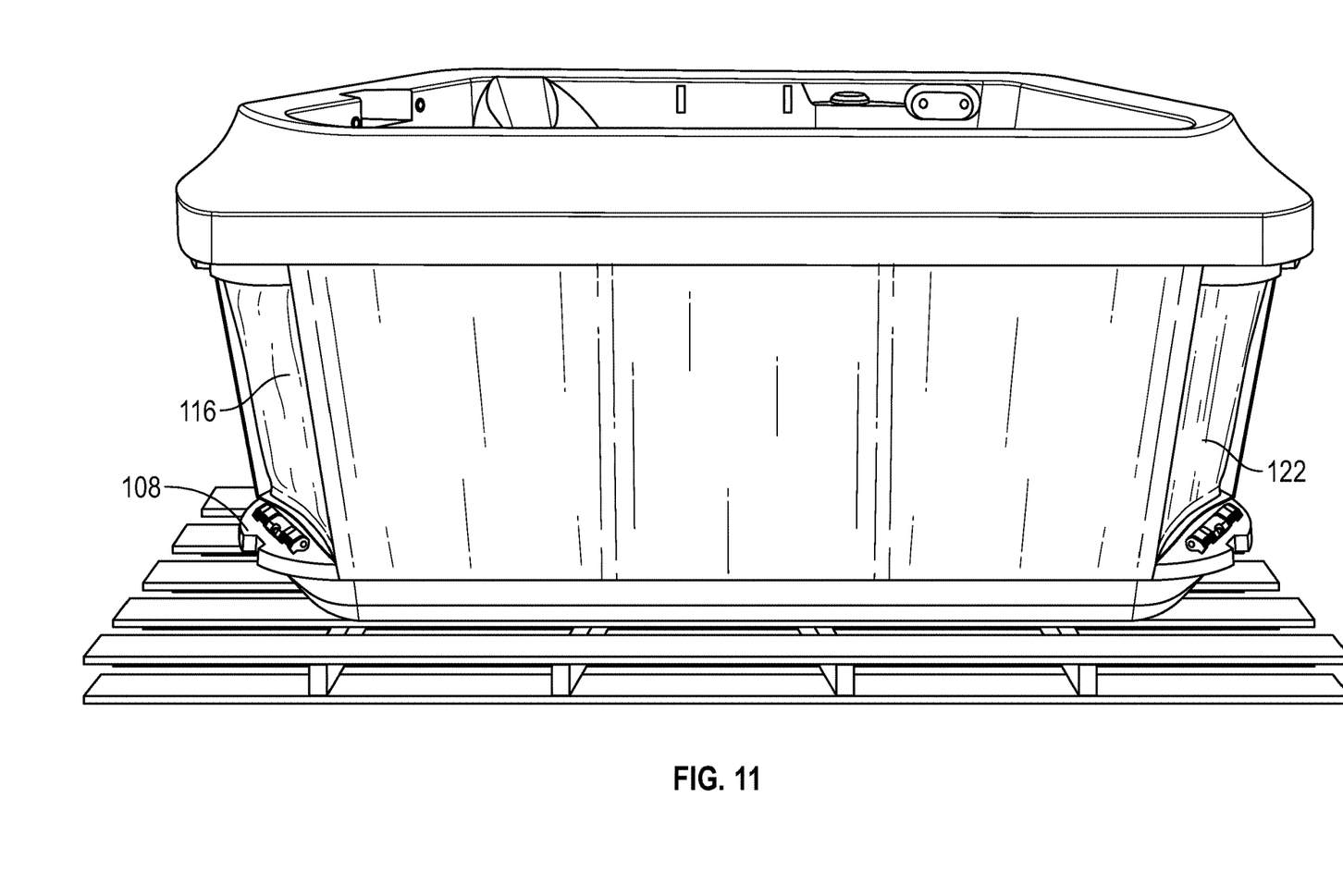
Figure 12:
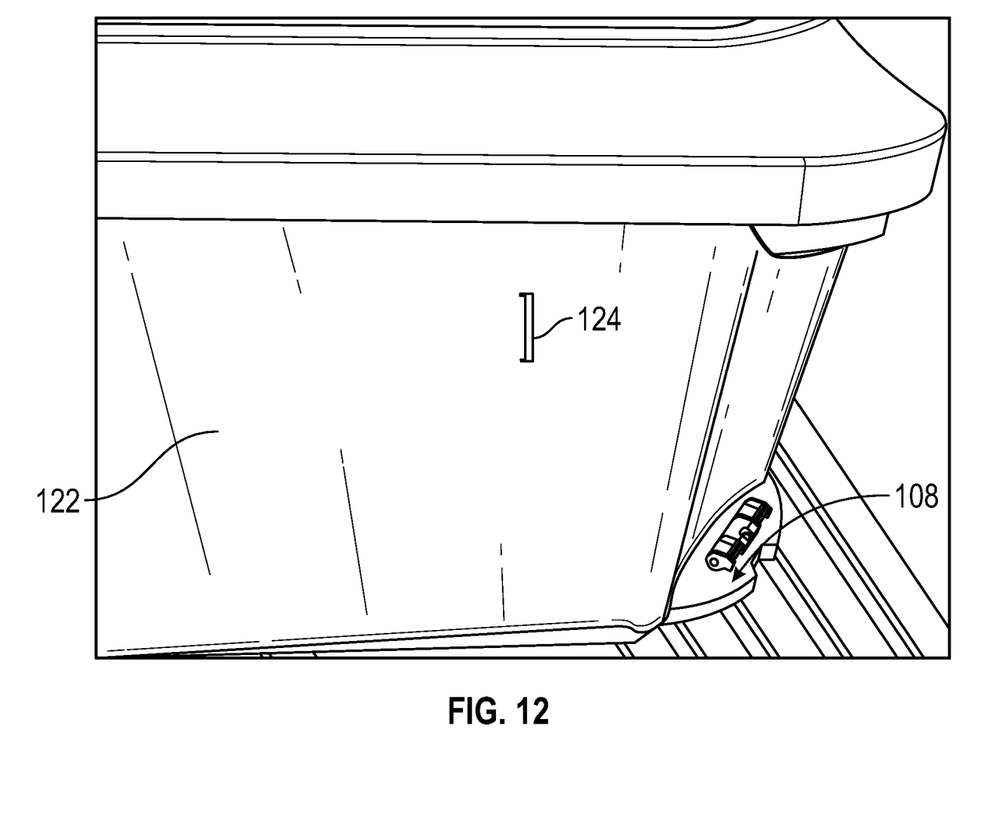
FIG. 12 shows a closer view of one rear corner of the spa wrapped with the insulative barrier.

Before or after the spa has been positioned in the operational or upright position, a fabric barrier 116 can be applied to one or more sidewalls 108c of the box frame 108 as shown in FIG. 8. In some methods, the fabric barrier 116 can be applied to all but one sidewall of the box frame 108, for example excluding the sidewall providing access to the equipment pack which may include electronics and controls. For example, with a box frame 108 having four sides, the fabric barrier 116 can be applied to three out of the four sidewalls. In other methods, the fabric barrier 116 may only be provided in select regions where machinery may have access to fill the undercabinet cavity with insulative fiberglass. For example, the fabric barrier 116 may only be applied in one or more corners of the box frame 108, for example the corners on the opposite side of the box frame 108 as the equipment pack.

The fabric barrier 116 can include a breathable material. The fabric barrier 116 may include a translucent or transparent material to enable visualization of insulative fiberglass fill behind the fabric barrier. The fabric barrier 116 can provide venting needed to release the blowing air. In other embodiments, the fabric barrier 116 can include an insulative material like any of the materials of the base insulation barrier 110.

Figure 14:
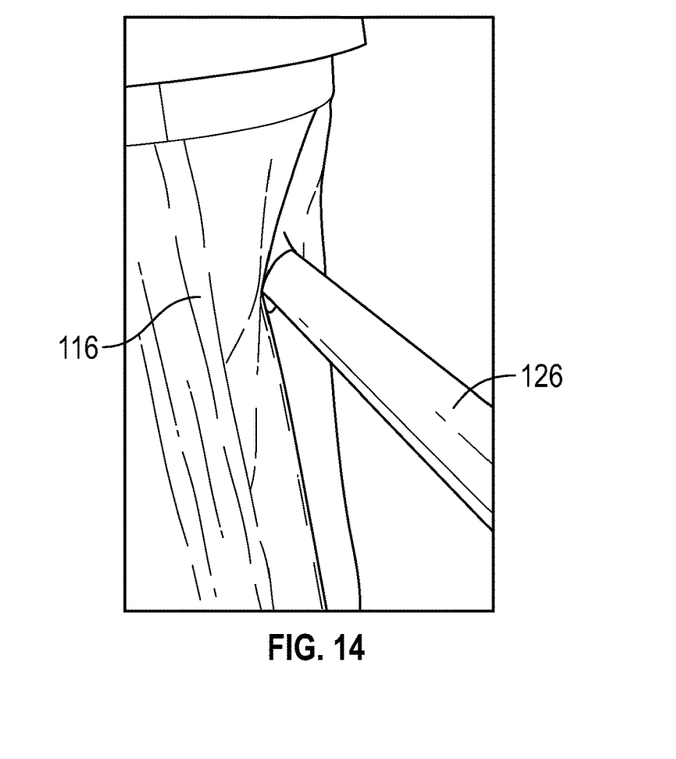
FIG. 14 shows one rear side corner of the spa (the rear side being on the opposite side of the spa from the equipment pack) with a filling hose/pipe extending through the fabric barrier positioned at the corner.
Figure 15:
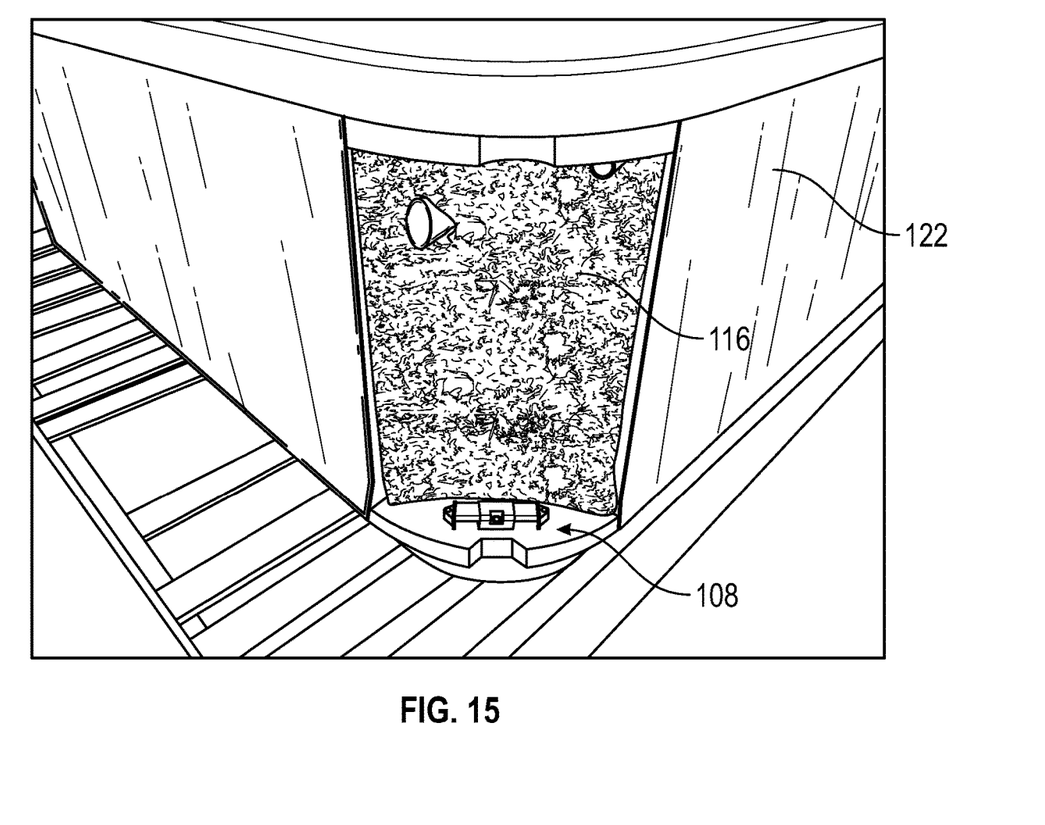
FIGS. 15 and 16 show a closer view of one rear corner of the spa covered by the breathable fabric with the fiberglass fill. As best seen in FIGS. 15 and 16, an opening is formed in the breathable fabric to receive the filling pipe depicted in FIG. 14.
Figure 16:
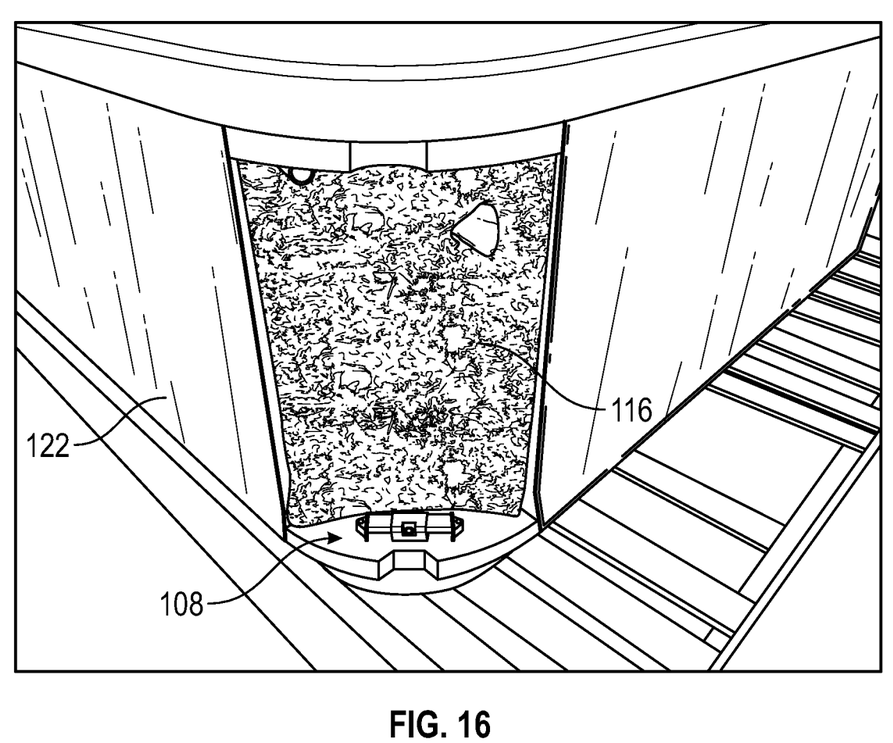

As shown in FIGS. 14-16, one or more holes may be cut in the fabric barrier 116 the insertion of a pipe for the blowing of the fiber. The one or more holes may be closer to the top side 108b of the frame 108 than the bottom side 108a of the frame 108. This method allows the filling to reach all empty spaces and fall toward the bottom of the base insulation barrier 110 with the optimal density. The number and points of pipe insertion can be varied. In one example, one hole or two holes in each region of the fabric barrier 116 at the rear corners (see FIGS. 15 and 16) can be sufficient for filling the undercabinet cavity of the spa.

In addition or in alternative to the fabric barrier 116, the spa can include an insulative barrier 122. The insulative barrier 122 can be a flexible material wrapped around or attached to one or more sidewalls of the box frame 108. The insulative barrier 122 may be applied over the fabric barrier 116 or in different regions from the fabric barrier 116. The insulative barrier 122 can include the same or different material compared to the base insulation barrier 110. For example, the insulative barrier 122 can include a sheet or sheets of reflective foil insultation, bubble wrap, or insulating fabric that is attached onto the exterior of the box frame 108. FIGS. 9-12 illustrates the insulative barrier 122 applied to the sidewalls 108c of the box frame 108, except on at least a portion of the front side to provide access to the equipment pack 120 (see FIG. 9) and the rear corners opposite the equipment pack 120 (see FIG. 10). For a box frame 108 having four sides, the insulative barrier 122 can be applied to three out of the four sidewalls. One or more holes may be cut into the insulative barrier 122 for additional access points for filling the undercabinet cavity of the spa with insulative fiberglass. The one or more holes may be cut in the left and right sidewalls, which are perpendicular to the front wall with the equipment pack. This can reduce the length of hose needed to fill the undercabinet cavity of the spa.

At this stage of installation, one or more corners of the spa, for example on the rear side of the spa, may not have the insulative barrier 122 to expose the fabric barrier 116. Venting can also be accomplished through flaps or holes 124 in the insulative barrier 122 that are closed after the undercabinet cavity has been filled with blown-in insulation (see FIG. 12).

Figure 13:
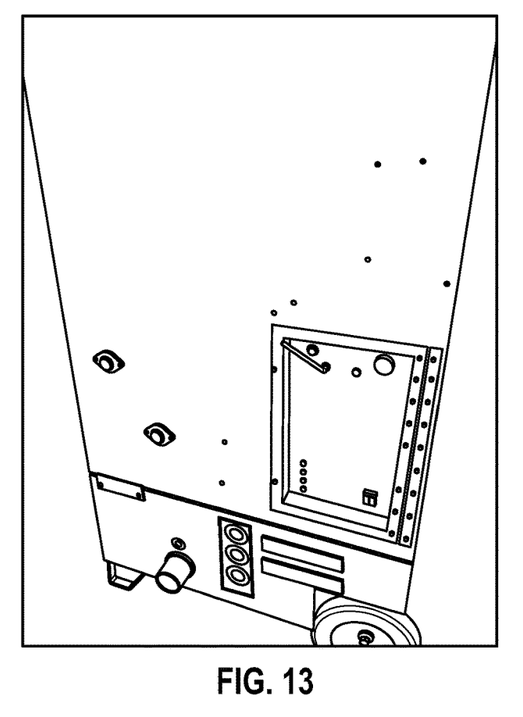
FIG. 13 shows an example of a pneumatic fiberglass strand shredding machine.

The blowing application can involve inserting a long pipe or rigid hose 126 from the pneumatic fiberglass strand shredding machine, shown in FIG. 13, into the undercabinet cavity of the spa. For example, the long pipe or rigid hose 126 can be inserted through each hole in the fabric barrier 116 and advanced forward, for example towards the front of the spa, until it nears the bulkhead 102. Filling then starts. The distal end of the pipe or rigid hose 126 can be moved backwards while varying its vertical position to aid in filling the entire undercabinet space. FIGS. 15 and 16 illustrate the spa after the undercabinet cavity has been filled with the insulative fiberglass. Because the fabric barrier 116 is at least partially transparent or translucent, the fiberglass fill is visible through the fabric barriers 116.

During this process, the air that is blown into the undercabinet cavity during the insulation filling step vents through the fabric barrier 116 and/or openings in the insulative barrier 122. The number of fabric barrier panels and their respective locations can be varied in other embodiments. The fabric barrier 116 can be located anywhere along one or more sidewalls 108c of the box frame 108.

Additionally, the undercabinet cavity can be filled by filling through one opening in the fabric barrier 116 on a first rear corner of the spa, and then filling through another opening in the other fabric barrier 116 on a second rear corner of the spa. Alternatively, the filling through both corners can occur simultaneously. Once filled, the fabric barriers 116 can be covered with the insulative barrier 122. Additionally, the openings in the fabric barriers 116 and/or insulative barrier 122 can be closed with tape, an adhesive patch, or similar means, or by sewing, stapling, or similar ways of closing. Closing preferably is done before covering the rear corner with the insulating barrier (if used).

The blown insulation can have a density within the range of at least about 1.0 pounds per cubic foot and/or less than or equal to about 3.0 pounds per cubic foot, for example at least about 1.6 pounds per cubic foot and/or less than or equal to about 2.3 pounds per cubic foot or at least about 2.0 pounds per cubic foot and/or less than or equal to about 2.6 pounds per cubic foot. For example, the density can be less than or equal to about 3.0 pounds per cubic foot, less than or equal to about 2.5 pounds per cubic foot, less than or equal to about 2.0 pounds per cubic foot, or less than or equal to about 1.5 pounds per cubic foot. In some embodiments, the density can be about 2.6 pounds per cubic foot, 2.5 pounds per cubic foot, 2.4 pounds per cubic foot, 2.3 pounds per cubic foot, 2.2 pounds per cubic foot, 2.1 pounds for cubic foot, or other values within the ranges described herein. These densities provide optimize insulating properties without compressing the blown in fiberglass.

The insulative fiberglass described herein can be fiberglass blowing wool, for example an unbonded blowing wool. The insulative fiberglass can be noncombustible, noncorrosive, and odor free. The insulative fiberglass can include a synthetic fiber, for example inorganic glass fibers that cannot rot, mildew, or otherwise deteriorate. The insulative fiberglass can include non-biopersistent or biosoluble glass fibers. The glass fibers may be combined with petroleum distillates and/or paraffinic. In some examples, the insulative fiberglass can be a white, virgin fiberglass. The insulative fiberglass can include recycled content making it more environmentally friendly.

The insulative fiberglass fill does not settle after installation resulting in no-loss of R-value after installation. This improves energy efficiency by at least 5% to 10% compared to other spa insulation products.

The insulative fiberglass can be hydrophobic to promote wicking and permit water to run through the fill. This enables service technicians to locate any possible leaks and use a vacuum to remove the water. In some embodiments, the fiberglass may change color in response to water to facilitate quick identification of any leaks.

To service a possible water leak, a service technician may access the undercabinet cavity of the spa by removing one or more side panels to expose the insulative barrier 122 and/or fabric barrier 116. The insulative barrier 122 and/or fabric barrier 116 may be cut or peeled back to expose the fiberglass fill. If necessary, portions of the fiberglass fill may be removed by hand to access any water leaks. The service technician may remove any water from the undercabinet cavity using a water vacuum. After the water has been removed, the previously removed fiberglass fill may be reused and inserted back into the undercabinet cavity. If needed, additional fiberglass fill may be added to fill any voices. Next, the insulative barrier 122 and/or fabric barrier 116 may be seals or reapplied to the frame 108 using staples, nails, tape, adhesive, or other fastening means. Thereafter, the side panel may be reattached to the spa.

Example Method of Manufacture

The following describes an example of the insulation process. The recited steps and sub-steps can be practiced in the order described by this example, but do not necessarily need to be practiced in the recited order.

Step 1: Bulkhead Installation

Figure 7:
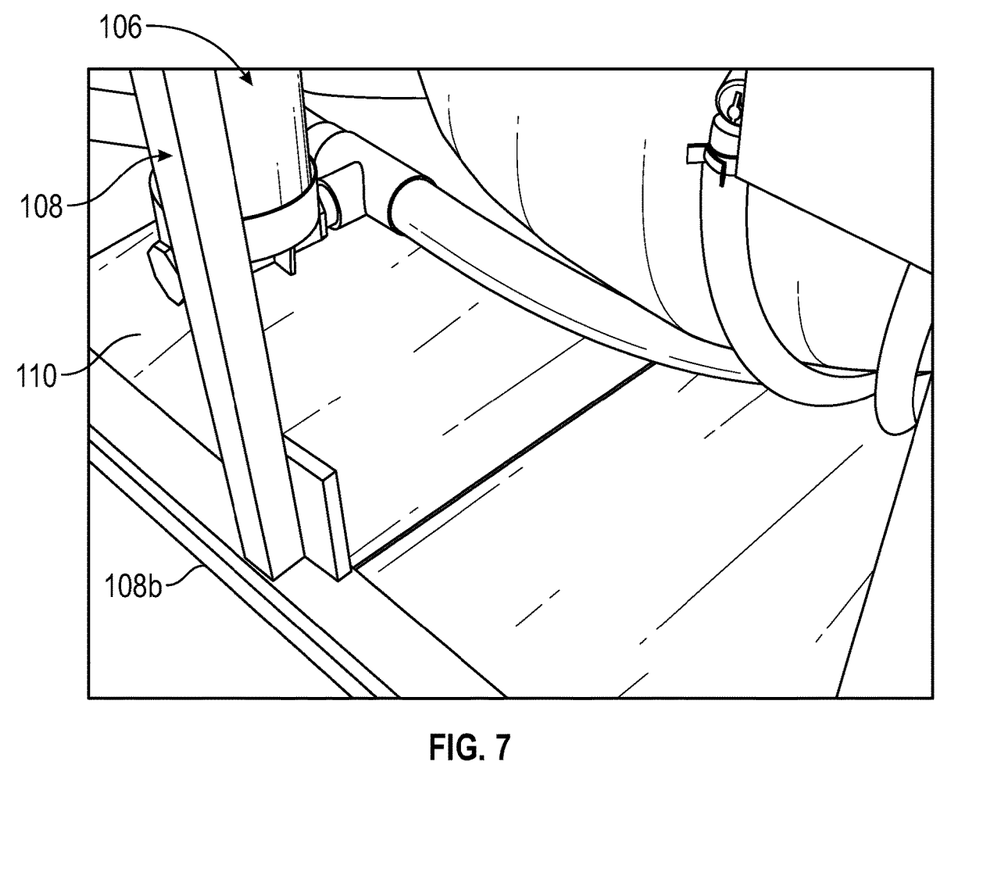
FIG. 7 shows the box frame in an operational or upright position and the base insulation barrier extending under the pipes.

Prior to the installation of the pumps, heaters and electric equipment pack, a flexible thermal barrier (bulkhead) is installed between the equipment pack and the rest of the spa. See the reference images (FIGS. 1-4) associated with this step. The procedure is as follows:
1. Preparing bulkhead
2. Installing bulkhead to equipment pack
3. Installing equipment pack to box frame
4. Stapling bulkhead to box frame to separate the equipment pack from the undercabinet cavity.
5. Remove excess with cutters Step 2: Base Barrier Application After plumbing and frame assembly is completed, the spa is still in the inverted position. A layer of flexible insulation barrier is installed onto the inner base of the box frame of the spa. See the reference images (FIGS. 5-7) associated with this step. The procedure is as follows:
1. Prepare plywood strips and insulation layer: cut plywood and insulation sheeting to length.
2. Place insulation barrier between side plywood strips and box frame, and staple plywood strips to box frame.
3. Stretch and staple all sides
4. Remove the excess with cutters Step 3: Sides Insulation Barrier Application Upon completion of the base insulation barrier (within the frame system), the spa is flipped to an upright position for water testing. After the water test is completed, the spa is moved to the next stage where the insulation barrier is applied to 3 sides of the outer perimeter of the spa frame, excluding the front equipment pack area. The insulation barrier layer preferably is formed of a flexible wrap (for example, a sheet or sheets of reflective foil insultation, bubble wrap, or insulating fabric) that is attached onto the exterior of the spa box frame. See the reference images (FIGS. 8-12). The procedure is as follows:
1. Preparing insulation fabric sheeting
2. Stapling insulation barrier to the bottom and top edges of the frame
3. Stapling insulation barrier to the sides of the spa
4. Cover all 3 sides of the spa, excluding the front equipment area (see FIGS. 9-11).

Step 4: Blown-In Insulation Process Application

After applying the side insulation barrier, the spa is ready for the application of insulation, following the next steps:
1. Preparing pneumatic fiberglass strand shredding machine (FIG. 13)
2. Preparing fiberglass blowing insulation
3. Cutting 2 blowing holes in insulation barrier (seen in FIGS. 14-16)
4. Blowing application (FIG. 14)

Terminology

Although certain embodiments have been described herein in connection fiber glass or glass wool, the systems and methods described herein can be used with other types of insulation, for example spray foam.

Moreover, although certain embodiments have been described herein in connection with portable spas, the insulation methods described herein can be used for any installation having a basin of water and plumbing, for example a bathtub or swim spa.

The terms "comprising," "including," "having," and the like are synonymous and are used inclusively, in an openended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Although certain embodiments and examples have been described herein, it will be understood by those skilled in the art that many aspects of the systems and methods shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The following is claimed:

1. A method of insulating a spa comprising:
installing a flexible bulkhead in a box frame to separate equipment from the box frame, the box frame having a top side and a bottom side separated by sidewalls;
mounting a barrier to one or more of the sidewalls of the box frame; and
accessing a cavity of the box frame through one or more openings in the barrier on the one or more sidewalls of the box frame;
blowing in insulative fiberglass through the one or more openings in the barrier and into a portion of the cavity between the flexible bulkhead and the one or more sidewalls of the box frame when the box frame is in an upright position.

2. The method of claim 1, wherein the one or more openings in the barrier are on a rear side of the box frame.

3. The method of claim 2, further comprising installing equipment pack on a front side of the box frame.

4. The method of claim 2, wherein the one or more openings in the barrier are at one or more corners on the rear side of the box frame.

5. The method of claim 1, wherein the one or more openings are located closer to a top side of the box frame than a bottom side of the box frame.

6. The method of claim 1, wherein the barrier comprises a breathable fabric.

7. The method of claim 6, further comprising mounting an insulative barrier over at least a portion of the barrier on the one or more sidewalls of the box frame.

8. A method of insulating a spa comprising:
mounting a base insulation barrier to a box frame comprising a top edge, a bottom edge, and sidewalls separating the top edge from the bottom edge, wherein the base insulation barrier is mounted at a position spaced apart from the bottom edge of the box frame to form an air insulation layer between the base insulation barrier and the bottom edge of the box frame;
mounting an insulative barrier to one or more of the sidewalls of the box frame;
accessing a cavity of the box frame through one or more sidewalls of the box frame; and
blowing insulative fiberglass through the one or more sidewalls of the box frame and into the cavity.

9. The method of claim 8, further comprising mounting a fabric barrier to one or more of the sidewalls of the box frame.

10. The method of claim 9, wherein the insulative barrier is mounted over at least a portion of the fabric barrier.

11. The method of claim 9, wherein accessing the cavity of the box frame comprises accessing the cavity through one or more openings in the fabric barrier.

12. The method of claim 8, wherein accessing the cavity of the box frame comprises accessing the cavity through one or more openings in the insulative barrier.

13. A spa comprising:
a box frame comprising a top edge and a bottom edge separated by sidewalls, the box frame defining a cavity, the bottom edge facing the ground, in use;
a base insulation barrier mounted to the box frame, the base insulation barrier positioned closer to the bottom edge of the box frame than the top edge of the box frame, the base insulation barrier separated from the bottom edge of the box frame to form an air insulation layer;
insulative fiberglass within the cavity of the box frame;
a fabric barrier mounted to one or more sidewalls of the box frame, the fabric barrier comprising one or more openings for receiving insulative fiberglass; and
an insulative barrier mounted to one or more sidewalls of the box frame.

14. The spa of claim 13, wherein the base insulation is a continuous surface with no openings or accessible openings to fill a cavity in the box frame.

15. The spa of claim 13, further comprising a flexible bulkhead separating equipment from the insulative fiberglass, the flexible bulkhead comprising openings for piping to pass through the flexible bulkhead.

16. The spa of claim 13, wherein the fabric barrier sufficiently translucent to visualize the insulative fiberglass.

17. The spa of claim 13, wherein the fabric barrier comprising a breathable material.

18. The spa of claim 13, wherein the insulative barrier is mounted over the fabric barrier in at least one region of the box frame.

19. The spa of claim 13, wherein the insulative barrier comprises one or more openings for receiving insulative fiberglass or venting.

20. The spa of claim 13, wherein the insulative fiberglass is hydrophobic.

21. The spa of claim 13, wherein the insulative fiberglass changes color when coming into contact with moisture.

22. A method of servicing a spa having a leak, the method comprising:
    removing an external side panel of the spa;
    after removing the external side panel, removing an insulative barrier from a sidewall of the spa to access insulative fiberglass within a cavity of a box frame;
    locating the leak within the cavity of the box frame;
    removing moisture caused by the leak;
    adding insulative fiberglass to the cavity of the box frame; and
    reinstalling the insulative barrier and the external side panel of the spa.

23. The method of claim 22, further comprising identifying the leak based on a change in color in the insulative fiberglass.

24. The method of claim 22, wherein reinstalling the insulative barrier comprising applying an adhesive tape.

* * * * *